United States Patent Office 3,503,989
Patented Mar. 31, 1970

3,503,989
N-CHLORO-ALIPHATIC - N'-(5-NITROTHIAZOLYL)-UREAS AND CYCLIZED COMPOUNDS THEREOF
Paul Schmidt, Therwil, Max Wilhelm, Allschwil, and Kurt Eichenberger, Therwil, Switzerland, assignors to Ciba Corporation, New York, N.Y., a corporation of Delaware
No Drawing. Continuation-in-part of application Ser. No. 564,536, July 12, 1966. This application Nov. 15, 1966, Ser. No. 594,403
Claims priority, application Switzerland, May 30, 1962, 6,604/62; Apr. 23, 1963, 5,056/63; Aug. 30, 1963, 10,800/63; Apr. 24, 1964, 5,395/64; July 8, 1964, 8,961/64; Sept. 3, 1964, 11,534/64; Mar. 3, 1965, 2,949/65; Mar. 31, 1965, 4,423/65; July 20, 1965, 10,198/65
The portion of the term of the patent subsequent to Apr. 13, 1982, has been disclaimed
Int. Cl. C07d 91/34
U.S. Cl. 260—306.8      6 Claims

ABSTRACT OF THE DISCLOSURE

Antiparasitic and antibacterial 2-oxo-1,3-diaza-cycloalkanes of the formula

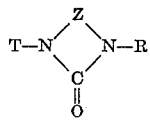

in which T represents a 5-nitrothiazolyl-2-radical; Z stands for a lower alkylene radical which separates the two nitrogen atoms by 2 to 5, preferably by 3 or 4 but above all by 2, carbon atoms and which may be substituted by one or several, possily substituted, hydrocarbon radicals, and R represents a hydrogen atom, an acyl radical or an unsubstituted or substituted hydrocarbon radical of aliphatic character, above all a lower alkyl radical which is unsubstituted or substituted by a hydroxyl group or by a free or substituted amino group, or a lower alkenyl or an araliphatic radical and, as the case may be, their salts prepared by cyclization of the corresponding N-chloro-aliphatic-N'-(5-nitrothiazolyl)-ureas.

---

This is a continuation-in-part of our copending application Ser. No. 564,536, filed July 12, 1966 (now U.S. Patent No. 3,298,914), which is a continuation-in-part of Ser. No. 485,927, filed Sept. 8, 1965 (now U.S. Patent No. 3,299,069), which in turn is a continuation-in-part of Ser. No. 447,868, filed Apr. 13, 1965 (now abandoned), which in turn is a continuation-in-part of our application Ser. No. 391,294, filed Aug. 21, 1964 (now abandoned, which in turn is a continuation-in-part of our application, Ser. No. 282,589, filed May 23, 1963 (now abandoned).

The present invention relates to new 2-oxo-1,3-diazacycloalkanes. Especially it concerns 2-oxo-1,3-diaza-cycloalkanes of the formula

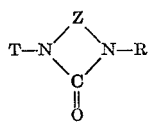

in which T represents a 5-nitrothiazolyl-2 radical; Z stands for a lower alkylene radical which separates the two nitrogen atoms by 2 to 5, preferably by 3 or 4 but above all by 2, carbon atoms and which may be substituted by one or several, possibly substituted, hydrocarbon radicals, and R represents a hydrogen atom, an acyl radical or an unsubstituted or substituted hydrocarbon radical of aliphatic character, above all a lower alkyl radical which is unsubstituted or substituted by a hydroxyl group or by a free or substituted amino group, or a lower alkenyl or an araliphatic radical and, as the case may be, their salts.

Particularly suitable as hydrocarbon radicals are lower alkyl, lower alkenyl, phenyl and phenyl-lower alkyl radicals such as benzyl- or phenylethyl radicals. These phenyl or phenyl-lower alkyl groups may be substituted especially by lower alkyl groups, lower alkoxy groups such as methoxy, ethoxy, propoxy or butoxy groups, or halogen atoms such as chlorine or bromine, trifluoromethyl groups or nitro groups.

In the foregoing and following lower alkyl radicals are preferably those which contain up to 5 carbon atoms, such as methyl, ethyl, propyl, isopropyl, butyl, isobutyl or pentyl groups. Lower alkenyl radicals are above all allyl or methallyl radicals. As araliphatic radicals there may be mentioned above all phenyl-lower alkyl groups, such as benzyl, 1-phenylethyl or 2-phenylethyl radicals. The araliphatic radicals may be substituted on the carbon atoms, especially on the aryl radicals by halogen atoms such as chlorine or bromine, the pseudohalogen trifluoromethyl, lower alkyls such as methyl or ethyl, by lower alkoxy groups such as methoxy, ethoxy or methylenedioxy or by nitro groups.

Substituted amino groups are monosubstituted or preferably disubstituted amino groups, and the substituents may be above all lower alkyl, lower alkenyl, lower cycloalkyl radicals, or alkylene, mono-axa- or mono-aza-alkylene radicals having from 4 to 8 carbon atoms. There may be mentioned, for example, mono- or di-lower alkylamino groups such as methylamino, ethylamino, dimethylamino, diethylamino, dipropylamino, cyclohexylamino, methylcyclohexylamino, ethyl-cyclopentylamino, diallylamino, allyl-ethylamino or methallylamino groups, pyrrolidino, piperidino, morpholino, hexa- or heptamethyleneamino, piperazino, N-lower alkyl piperazino or N-(hydroxy-lower alkyl)-piperazino groups such as N-methylpiperazino or N-hydroxyethyl-piperazino groups.

If the radical R represents a substituted lower alkyl radical it stands more especially for a hydroxy- or tertiary amino-ethyl or -propyl radical, above all it represents a hydroxymethyl or a tertiary aminomethyl group.

Particularly suitable acyl radicals are those of carboxylic acids, in the first place the acyl radicals of aliphatic carboxylic acids, such as lower alkanoic acids, for example propionic, butyric, trimethylacetic or valeric acid or above all acetic acid, or of substituted lower alkanoic acids, such as halogen-lower alkanoic acids, for example mono- or dichloro-acetic acid or trifluoracetic acid. As further suitable acyl radicals there may be mentioned the radicals of aromatic or araliphatic carboxylic acids, such as those of benzoic acids or phenyl-lower alkane- or -alkene acids, for example phenylacetic acids, phenylpropionic acids, or cinnamic acids; also the acyl radicals of heterocyclic carboxylic acids, for example of pyridine-, furan- or thiophene-carboxylic acids. The aromatic or heterocyclic rings of these carboxylic acids may also be substituted, for example by halogen, lower alkoxy, lower alkyl, trifluoromethyl, nitro or amino groups.

The new compounds may be further substituted, more especially in the 4-position of the thiazole ring, for example, by lower alkyl radicals, such as methyl, ethyl, propyl, isopropyl, butyl, isobutyl or pentyl, lower alkenyl radicals such as allyl or methally, or by phenyl groups, and the phenyl radicals themselves may likewise be substituted, for example as indicated above for the phenyl groups.

The radical Z is especially an unsubstituted ethylene-(1,2)-radical or an ethylene-(1,2)-radical substituted by lower alkyl radicals, or a propylene-(1,2), butylene-(1,4), or pentylene-(1,5) radical which may be substituted by lower alkyl radicals.

The new compounds possess valuable pharmacological, especially antiparasitic and antibacterial properties. They are primarily suitable for the treatment of protozoic and helminthic conditions, for example in infested animals, for example mice, against Gram-negative bacteria, for example Salmonella typhi or coli bacilli, such as Escherichia coli. As has been demonstrated by experiments on hamsters, for example, the new compounds are particularly effective against trichomonades and amoebae, and for example in mice and sheep against schistosomes. The new compounds also act against coccidia. Accordingly, the new compounds may be used as antiparasitic and antibacterial agents. They are especially suitable for the treatment of diseases caused by the pathogens mentioned. The new compounds are also valuable intermediates for the manufacture of other useful substances.

Especially valuable are the compounds of the formula

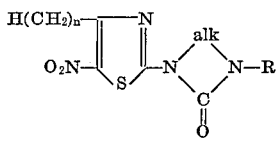

II in which R stands for the radical of the formula—$(CH_2)_mH$ and m and n each stands for an integer from 0 to 5 and alk for a straight or branched lower alkylene radical separating the two nitrogen atoms by 2 to 5 carbon atoms, the compounds of the above mentioned Formula II in which n and alk have the meanings given above and R represents a hydroxy-lower alkyl radical, especially the hydroxymethyl radical, the compounds of the above mentioned Formula II in which n and alk have the meanings given above, R stands for a di-lower alkyl-amino-lower alkyl radical, especially a di-lower alkyl-amino-methyl radical, and their acid addition salts, and the compounds of the Formula II in which n and alk have the meanings given above and R stands for lower alkanoyl.

Especially preferred groups of compounds are those of the formula

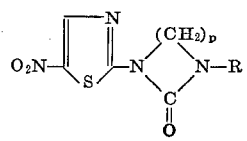

III in which p stands for an integer from 2 to 4 and R for a hydrogen atom, those of Formula III in which p has the meaning given and R stands for a hydroxy-lower alkyl radical, especially for the hydroxymethyl radical, those of the Formula III in which p has the meaning given and R represents a di-lower alkyl-amino-lower alkyl radical, especially a di-lower alkyl-aminomethyl radical, and their acid addition salts, and the compounds of Formula III in which p has the meaning given and R stands for a lower alkanoyl radical, such as the acetyl radical.

A specially good action against amoebae and schistosomes exert the 1-[5-nitro-thiazolyl-(2)]-2-oxotetrahydro-imidazole, the 1-[5-nitrothiazolyl-(2)]-2-oxohexahydropyrimidine and the 1-[5-nitrothiazolyl-(2)]-2-oxo-3-acetyl-tetrahydroimidazole.

The new compounds are manufactured by known methods.

For example, the new compounds are obtained when a compounds of the general formula

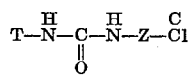

where T, Z and R have the above meanings, is subjected to intramolecular condensation accompanied by elimination of hydrochloric acid and, if desired, in a compound so obtained the radical R is introduced into the 3-position of the diaza-cycloalkane ring.

The intramolecular condensation (cyclisation) is preferably performed by heating, advantageously in the presence of a polar solvent, above all water, and/or in the presence of a condensing agent, especially a basic condensing agent such as an alkali metal acetate or carbonate, if desired in a suitable solvent, such as an acid amide, for example dimethylformamide.

According to another process for the manufacture of the new compounds a compound of the general formula

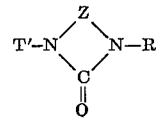

V where R and Z have the above meanings and T' is a thiazolyl-2 radical which is unsubstituted in position 5- is nitrated. Nitration is carried out in the manner known in thiazole chemistry, for example by treatment with a mixture of concentrated sulfuric and concentrated nitric acid or with the mixed anhydride of nitric acid and a carboxylic acid, such as acetic acid. Any phenyl groups present may be nitrated at the same time.

The introduction of a substituent R into a compound in which R is a hydrogen atom is performed in the known manner, for example in the manufacture of compounds in which the substituent R is an unsubstituted or substituted hydrocarbon radical of aliphatic character, such as a lower alkyl radical which is unsubstituted or substituted by a hydroxyl group or by a free or substituted amino group, or a lower alkenyl or an araliphatic radical and in which the substituent R contains no hydroxyl or amino groups or in which any hydroxyl or amino groups present in R are separated from the cyclic nitrogen atom by at least 2 carbon atoms, by reaction with a halide of the formula R—X in which R has the above meaning and X represents a halogen atom, such as a chlorine atom. If desired, this operation is performed with a metal salt such as an alkali metal salt of the 3-unsubstituted 2-oxotetrahydro-imidazole, or in the presence of a basic condensing agent, especially a condensing agent capable of forming metal salts, such as an amide, hydride, hydrocarbon, hydroxide, alcoholate or carbonate of an alkali metal.

Compounds in which R is a methyl radical that carries a hydroxyl group or a free or substituted amino group, especially a hydroxymethyl or secondary or tertiary aminomethyl radical are obtained by reaction with formaldehyde, if desired or required in the presence of ammonia or of an amine.

Introduction of the hydroxymethyl group is achieved by a simple reaction with formaldehyde, if desired in the form of a formaldehyde donor, such as trioxymethylene or paraformaldehyde, advantageously in the presence of a basic condensing agent, such as an alkali metal hydroxide or carbonate, or of a tertiary amine or quaternary ammonium hydroxide, such as triethylamine or benzyltrimethyl ammonium hydroxide.

The aminomethyl group is advantageously introduced by the Mannich reaction, for example with formaldehyde, with the use of a salt of ammonia or of an amine. Also in this case the formaldehyde may be used in the form of a donor, such as trioxymethylene or paraformaldehyde, if desired in the presence of an acid.

The introduction of an acyl radical in 3-position of a 3-unsubstituted 1-[5-nitrothiazolyl]-1,3 - diazacycloalkane is performed e.g. by reaction of a compound of the formula

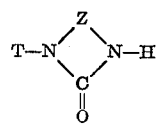

in which T and Z have the meanings given above, with reactive derivatives of acids, above all the halides, such as chlorides or bromides, or their anhydrides. It is advantageous to use a condensing agent. Thus bases such as pyridine or acylate ions promote the reaction of the acid anhydrides, and bases, such as pyridine or alkali, for example sodium carbonate, promote the reaction of the acid halides.

The above-mentioned reactions are performed in the usual manner.

Depending on the reaction conditions and starting materials used, the final products having substituted or unsubstituted amino groups are obtained in the free form or in the form of their salts which are likewise included in the present invention. A resulting amine can be converted into a salt thereof in the usual manner by reaction with an organic or inorganic acid, especially one that is suitable for the formation of therapeutically acceptable salts. On the other hand, a resulting salt can be converted into the free form in the usual manner, for example by treatment with a basic agent or ion exchange resin. Acids, suitable for the formation of therapeutically acceptable salts, are for instance hydrohalic, sulfuric or phosphoric acids, nitric or perchloric acid; alicyclic, aromatic or heterocyclic carboxylic or sulfonic acids such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicylic, para-aminosalicyclic or embonic acid, methanesulfonic, ethanesulfonic, hydroxyethanesulfonic, ethylenesulfonic acid, halogenbenzenesulfonic, toluenesulfonic, naphthalenesulfonic acids or sulfanilic acid; methionine, tryptophan, lysine or arginine.

These or other salts of the new compounds, for example, the picrates, can also be used for purification of the amines obtained; the amines are converted into salts, the salts are separated and the amines are liberated from the salts. In view of the close relationship between the free amino-compounds and the amino-compound in the form of a salt thereof, whenever a free amine is referred to in this context, a corresponding salt is also intended provided such is possible or applicable under the circumstances.

The invention further includes any variant of the present process in which an intermediate product obtainable at any stage of the process is used as starting material and any remaining steps are carried out, or the process is discontinued at any stage thereof, or in which a starting material is formed under the reaction conditions or is used in the form of a salt.

It is advantageous to use starting materials that give rise to the final products described above as being particularly valuable.

The starting materials used are known or, insofar as they are new, they can be prepared by known methods.

The new compounds may be used for example in the form of pharmaceutical preparations which contain them in the free form or in the form of their salts in conjunction or admixture with an organic or inorganic solid or liquid pharmaceutical excipient suitable for enteral, parenteral or local administration. Suitable excipients are substances that do not react with the new compounds, for example water, gelatine, lactose, starches, magnesium stearate, talcum, vegetable oils, benzyl alcohol, gums, polyalkyleneglycols, white petroleum jelly, cholesterol or other known medicinal excipient. The pharmaceutical preparations may be, for example, tablets, dragees, ointments or creams, or in liquid from solutions, suspensions or emulsions. They may be sterilized and/or contain assistants such as preserving stabilizing, wetting or emulsifying agents, salts for regulating the osmotic pressure, or buffers. They may also contain further therapeutically valuable substances, such as for example 2-sulfanilamido-6-chloropyrazine.

The above-mentioned products may also be used in conjunction with conventional animal fodders or vehicles as fodders or additives to fodders in animal husbandry.

The following examples illustrate the invention.

EXAMPLE 1

25 grams of N-(2-chlorethyl)-N'-[5 - nitrothiazolyl-(2)]-urea in 1 liter of water are stirred and heated for 7 hours to the boil. The precipitate formed is filtered off and recrystallized from dimethylformamide+methanol, to yield 1-[5-nitrothiazolyl - (2) - ] - 2 - oxo-tetrahydroimidazole of the formula

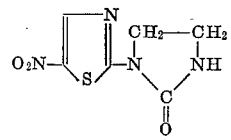

in yellow crystals metling at 259–260° C.

The urea used as starting material may be prepared as follows:

A solution of 25 grams of 2-amino-5-nitrothiazole and 50 grams of 2-chlorethyl isocyanate in 250 cc. of tetrahydrofuran is heated in a closed vessel for 16 hours at 80 to 90° C. After cooling, 150 cc. of tetrahydrofuran are evaporated, the precipitate formed is suctioned off and thoroughly washed with warm isopropyl ether, to yield N-(2-chlorethyl)-N'-[5-nitrothiazolyl-(2)]-urea in crystals melting at 140° C. with decomposition.

EXAMPLE 2

25 g. of N-(2-chloropropyl)-N'-[5-nitro-thiazolyl-(2)]-urea are boiled for 4 hours in a solution of 14 g. of sodium acetate in 200 cc. of water. The precipitate which forms is filtered off and recrystallized from dimethyl formamide+ethanol. There is thus obtained the 1-[5-nitrothiazolyl-(2)]-2-oxo-5-methyl-tetrahydroimidazole of the formula

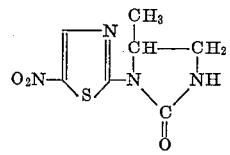

in the form of yellow crystals of melting point 237–238° C.

The urea used as starting material can be prepared as follows:

To a suspension of 5 g. of potassium carbonate in 50 cc. of acetone are added 14.5 g. of 2-amino-5-nitrothiazole and 12 g. of 2-chloro-propylisocyanate. The mixture is stirred at the boiling temperature for 3 hours and the precipitate that forms is filtered off and washed with water. The filter residue is recrystallized from ethanol+water. There is obtained N-(2-chloro-propyl)-N'-[5-nitrothiazolyl-(2)]-urea in the form of crystals which melt at 170–172° C.

EXAMPLE 3

22 g. of N-[2-chloro-butyl-(3)]-N'-[5-nitro-thiazolyl-(2)]-urea are heated at 100° C. for 10 minutes with 13 g. of sodium acetate in 40 cc. of dimethyl formamide. There are then added 200 cc. of water, and the precipitate which forms is filtered off. The filter residue is washed with 1 N-sodium hydroxide solution and, for further purification recrystallized from dimethyl formamide+ethanol. There is obtained the 1-[5-nitro-thiazolyl-(2)]-2-oxo-4:5-dimethyl-tetrahydroimidazole of the formula

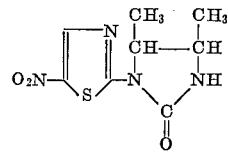

in the form of yellow crystals of melting point 242–243° C.

The urea used as starting material is prepared as follows:

14 g. of 2-amino-5-nitrothiazole are heated to 100° C. for four hours with 12 g. of 2-chloro-butyl-(3)-iso-cyanate in 100 cc. of absolute tetrahydrofuran. The solution is then evaporated to dryness under reduced pressure. The residue is recrystallized from ethanol to obtain N-[2-chloro-butyl-(3)]N′-[5-nitro-thiazolyl-(2)]-urea in the form of crystals melting at 195° C.

EXAMPLE 4

15 g. of 1-[4-phenyl-thiazolyl-(2)]-[2-oxo-tetrahydroimidazole are introduced into 50 cc. of concentrated sulfuric acid in such manner that the temperature does not rise above 10° C. After that, 7 g. of concentrated nitric acid are slowly added dropwise, and the mixture stirred at room temperature for 5 hours. The reaction mixture is poured on to ice. A precipitate forms which is filtered off and recrystallized from dimethyl formamide. The 1-[4-para-nitrophenyl-5-nitro-thiazolyl-(2)]-2-oxo-tetrahydroimidazole of the formula

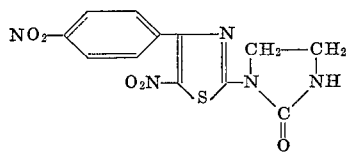

is obtained in the form of yellow crystals of melting point 286–288° C.

The 1-[4-phenyl-thiazolyl-(2)]-2-oxo-tetrahydroimidazole used as starting material can be prepared as follows:

10 g. of 2-chloro-ethyl-isocyanate are added to 10 g. of 2-amino-4-phenyl-thiazole in 50 cc. of dimethyl formamide and the mixture heated at 80° C. for 2 hours. The mixture is then cooled treated with water, and the precipitate that forms recrystallized from ethanol. There is thus obtained N-[4-phenyl-thiazolyl-(2)]-N′-(2-chlorethyl)-urea of melting point 173–174° C.

10 g. of the urea are heated at 110° C. for 30 minutes with 6 g. of sodium acetate in 100 cc. of dimethyl formamide. There are then added 300 cc. of water. The precipitate which forms is recrystallized from aqueous dimethyl formamide to obtain 1-[4-phenyl-thiazolyl-(2)]-2-oxo-tetrahydro-imidazole in the form of white crystals melting at 250–252° C.

EXAMPLE 5

A mixture of 16.0 g. of 2-amino-4-methyl-5-nitrothiazole, 11.0 g. of β-chloroethylisocyanate, 5.0 g. of potassium carbonate, and 150 cc. of acetone is stirred while being boiled for 17 hours, N-(2-chloroethyl)-N′-[4-methyl-5-nitro-thiazonyl-(2)]-urea being intermediately formed and partly cyclized. The batch is then cooled, treated with 200 cc. of water, and the resulting precipitate, which is a mixture of N-(2-chloroethyl)-N′-[4-methyl-5-nitro-thiazolyl-(2)]-urea and 1-[4-methyl-5-nitro-thiazolyl-(2)]-2-oxo-tetrahydro-imidazole, is filtered off. The residue is introduced into 50 cc. of dimethyl formamide and, after the addition of 10.0 g. of sodium acetate, heated at 100° C. for 30 minutes. Water is then added and the resulting precipitate recrystallized from dimethylformamide+ethanol. 1-[4-methyl-5-nitro-thiazolyl-(2)]-2-oxo-tetrahydro-imidazole of the formula

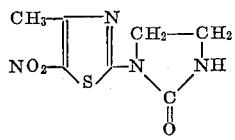

is obtained in the form of yellow crystals of melting point 241–243° C.

EXAMPLE 6

10 grams of 1-[5-nitrothiazolyl-(2)]-2-oxo-tetrahydroimidazole are dissolved in 40 cc. of dimethylformamide. 50 cc. of a 30% formaldehyde solution in water are then added followed by 0.5 cc. of an 80% solution of benzyltrimethyl-ammoniumhydroxide in methanol. After the reaction mixture has been allowed to stand for 2 hours at room temperature, 1-[5-nitrothiazolyl-(2)]-2-oxo-3-hydroxymethyl-tetrahydroimidazole of the formula

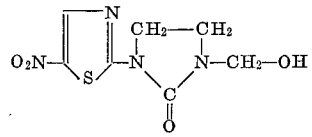

is precipitated by the addition of water. After recrystallization from a mixture of dimethylformamide and water, the compound melts at 185 to 187° C.

EXAMPLE 7

10 grams of 1-[5-nitrothiazolyl-(2)]-2-oxo-tetrahydroimidazole, 1.4 grams of paraformaldehyde and 3.8 grams of dimethylaminehydrochloride are heated for 4 hours at 120° C. in 100 cc. of dimethylformamide. After cooling the reaction mixture, a precipitate is obtained that is purified by recrystallization from highly dilute hydrochloric acid. 1-[5-nitrothiazolyl-(2)]-2-oxo-3-dimethylaminomethyl-tetrahydroimidazole-hydrochloride of the formula

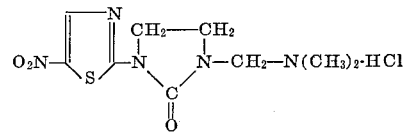

is obtained in the form of crystals melting at 278 to 280° C.

EXAMPLE 8

8.7 grams of 1-[4-methyl-5-nitrothiazolyl-(2)]-2-oxo-tetrahydroimidazole are dissolved in 30 cc. of dimethylformamide at 80° C. 2 drops of an 80% solution of benzyltrimethylammoniumhydroxide in methanol and 50 cc. of formalin of 40% strength are then added. After one hour, 200 cc. of water are added to the solution and the precipitate is recrystallized from methanol to yield 1-[4-methyl-5-nitro-thiazolyl-(2)]-2-oxo-3-hydroxymethyl-tetrahydroimidazole of the formula

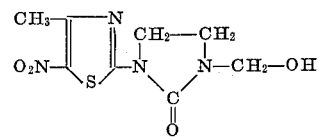

in the form of yellow crystals melting at 153–154° C.

EXAMPLE 9

A mixture of 10 grams of 1-[5-nitrothiazolyl-(2)]-2-oxo-tetrahydroimidazole, 1.4 grams of paraformaldehyde and 3.5 grams of methylamine hydrochloride in 80 ml. of dimethylformamide is heated for 3 hours at 120° C. with stirring. After cooling the reaction mixture, the precipitate is filtered and recrystallized from dimethylformamide+ethanol. 1-[5-nitrothiazolyl-(2)]-2-oxo-3-methylaminomethyl-tetrahydroimidazole hydrochloride of the formula

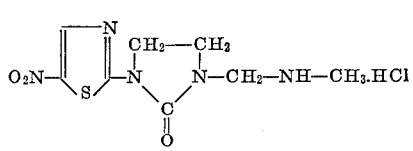

is obtained in the form of crytals melting at 260° C. with decomposition.

EXAMPLE 10

1.2 grams of sodium hydride are added to 100 ml. of dimethyl sulfoxide and the whole is heated for 2 hours at 70° C. with stirring. The reaction mixture is cooled to room temperature, 10 grams of 1-[5-nitrothiazolyl-(2)]-2-oxo-tetrahydroimidazole in 50 ml. of dimethyl sulfoxide are added dropwise and the batch stirred for 30 minutes. 8.0 grams of diethylaminoethyl chloride are then added dropwise. After stirring for 4 hours at 20–25° C. excess sodium hydride is destroyed by the addition of a little ethanol. On the addition of water, a brown precipitate settles which is filtered and dissolved in 2 N acetic acid. The solution is treated with active carbon, filtered and rendered neutral by the addition of sodium carbonate. 1 - [5 - nitrothiazolyl-(2)]-2-oxo-3-(β-dimethylaminoethyl)-tetrahydroimidazole of the formula

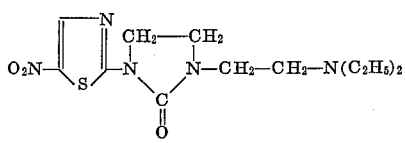

precipitates in the form of crystals melting at 140–141° C.

EXAMPLE 11

2 drops of an 80% solution of benzyltrimethylammoniumhydroxide in methanol and then 30 ml. of a formaldehyde solution of 30% strength are added to a solution of 8.0 grams of 1-[5-nitrothiazolyl-(2)]-2-oxo-5-methyl-tetrahydroimidazole in 30 ml. of dimethylformamide at 80° C. The batch is cooled to room temperature and after 8 hours 200 ml. of water are added. A precipitate of 1-[5-nitrothiazolyl - (2)] - 2 - oxo-3-hydroxymethyl-5-methyltetrahydroimidazole of the formula

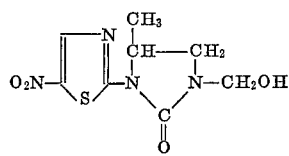

settles which, after recrystallization from methanol, melts at 170–174° C.

EXAMPLE 12

13.0 g. of N-[5-nitrothiazolyl-(2)] - N' - (3-chloropropyl)-urea are added to a solution of 7.0 g. of sodium acetate in 150 cc. of water and stirred for 3 hours at 90° C. The insoluble share is filtered off and recrystallized from dimethylformamide, to yield crystalline 1-[5-nitrothiazolyl-(2)]-2-oxo-hexahydropyrimidine of the formula

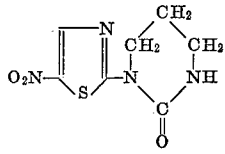

melting at 289° C.

The urea used as starting material can be prepared thus:

A mixture of 14.4 g. of 2-amino-5-nitrothiazole, 13.0 g. of 3-chloropropyl isocyanate and 100 ml. of dioxane is heated for 5 hours at 100° C. The insoluble share is then filtered. The filtrate is evaporated and the residue recrystallized from aqueous dioxane, to yield crystalline N-[5-nitro-thiazolyl-(2)]-N'-(3-chloropropyl)-urea melting at 168–170° C.

EXAMPLE 13

To a warm solution of 7.0 g. of 1-[5-nitro-5-thiazolyl-(2)]-2-oxo-hexahydropyrimidine in 30 ml. of dimethylformamide are added 2 drops of a 50% ethanolic solution of benzyltrimethylammoniumhydroxide and 50 ml. of 40% formalin. After 1 hour the mixture is treated with 200 ml. of water and recrystallized from methanol to obtain crystals of 1-[5-nitrothiazolyl-(2)]-3-hydroxymethyl-2-oxo-hexahydropyrimidine of the formula

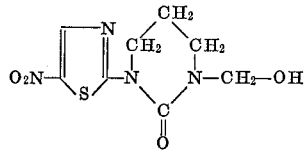

which melt at 158 to 160° C.

EXAMPLE 14

A mixture of 10 g. of 1-[5-nitrothiazolyl-(2)]-2-oxo-tetrahydroimidazole and 50 ml. of acetic anhydride is boiled for 4 hours and then allowed to cool to room temperature. The precipitate formed is filtered off and recrystallized from dimethyl-formamide+ethanol, to yield 1 - [5 - nitrothiazolyl-(2)]-2-oxo-3-acetyl-tetrahydroimidazole of the formula

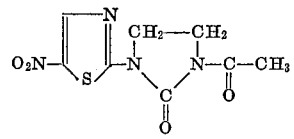

in yellow crystals melting at 163 to 166° C.

EXAMPLE 15

The new compounds can be used in the form of pharmaceutical preparations, the daily dose being 0.1 to 10 mg. per kg. of body weight. Administration can be carried out, for example, in the form of capsules containing the desired amount of the active substance, above all 1[5-nitrothiazolyl-(2)]-2-oxo-hexahydropyrimidine.

For use as additives to animal fodder, for example chickenfeed, the new compounds, especially 1-[5-nitrothiazolyl-(2)]-2-oxo-hexahydropyrimidine can be mixed, for example, with cerelose (content of active compounds, for example, 0.1 to 1%, preferably 0.5%). This preliminary mix can be added to the fodder in the usual manner, advantageously so that the mixture contains about 0.01% of the pyrimidine derivative.

EXAMPLE 16

Tablets containing 500 mg. of 1-[5-nitrothiazolyl-(2)]-2-oxo-tetrahydroimidazole may be prepared with the following ingredients:

| | Per tablet, mg. |
|---|---|
| 1-[5-nitrothiazolyl-(2)]-2-oxo-tetrahydro imidazole | 500.0 |
| Wheat starch | 40.0 |
| Colloidal silicic acid with hydrolysed starch | 30.0 |
| Arrowroot | 30.0 |
| Magnesium stearate | 6.0 |
| Talc | 19.0 |
| | 625.0 |

Method

Half of the wheat starch is pasted with four times the quantity of water on a waterbath. 1-[5-nitrothiazolyl-(2)]-2-oxo-tetrahydroimidazole is homogeneously mixed with the remaining starch, then kneaded with the paste and with a sufficient quantity of water to form a plastic mass. The colloidal silicic acid with hydrolysed starch is then worked in portions.

The plastic mass is passed through a sieve having a 4–5 mm. mesh and dried at 45° C. The dried granulate is passed through a sieve of 0.8–1.4 mm. mesh and the remaining disintegrating and lubricating agents are then added. After further homogenisation tablets having a diameter of 11.5 mm. and weighing 625 mg. are compressed in the conventional manner.

In the same manner, tablets containing 1-[5-nitrothi-azolyl-(2)] - 2 - oxo-3-(hydroxymethyl)-tetrahydroimidazole can be prepared.

EXAMPLE 17

7.8 g. of β-chloro-tertiary butylisocyanate in 15 ml. of acetone are added dropwise to 9.0 g. of 2-amino-5-nitrothiazole and 5.0 g. of anhydrous potassium carbonate in 60 ml. of acetone, and the mixture heated for 90 minutes at 45° C. 100 ml. of 2 N-hydrochloric acid are then added. The precipitate which forms is dissolved in 40 ml. of dimethyl formamide and the solution, after addition of 12.0 g. of sodium acetate, heated at 100° C. for 30 minutes. After cooling to room temperature, 100 ml. of water are added, and the resulting precipitate recrystallized from alcohol. There is obtained the 1-[5-nitro-thiazolyl(2)]-2-oxo-4,4-dimethyl-tetrahydro-imidazole of the formula

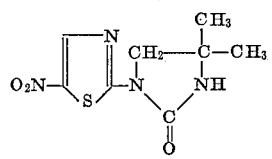

in the form of yellow crystals melting at 221–224° C.

The β-chloro-tertiary butylisocyanate (boiling at 53–56° C. under a pressure of 22 mm. Hg) used as starting material can be obtained from β-hydroxy-tertiary butylamine by reaction with thionyl chloride to form the β-chloro-tertiary butylamine hydrochloride, and treatment of the latter with phosgene by the method of W. Siefken, Ann. 562, 75 et seq. (1949).

EXAMPLE 18

2.5 g. of 1-[5-nitro-thiazolyl-(2)]-2-oxo-hexahydro-pyrimidine, 0.33 g. of paraformaldehyde, and 0.9 g. of dimethylamine hydrochloride in 25 cc. of dimethyl formamide are heated at 100° C. for 2 hours. The precipitate is filtered off with suction and recrystallized from 2 N-hydrochloric acid. The 1-[5-nitro-thiazolyl-(2)]-2-oxo-3-(dimethylaminomethyl)-hexahydro-pyrimidine hydrochloride of the formula

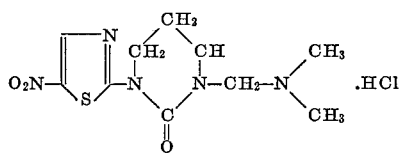

melts and decomposes at 258° C.

EXAMPLE 19

20.0 g. of 1-[5-nitro-thiazolyl-(2)]-2-oxo-tetrahydro-imidazole and 80.0 g. of chloracetic anhydride are heated together at 120° C. for 4 hours. After cooling, the reaction mixture is treated with 200 ml. of alcohol and filtered. The filter residue is recrystallized from aqueous dimethyl formamide. The resulting crystals of 1-[5-nitro-thiazolyl - (2)] - 2 - oxo-3-(chloroacetyl)-tetrahydro-imidazole of the formula

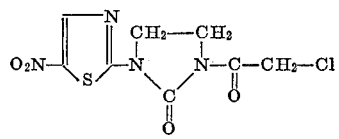

melt at 170–173° C.

EXAMPLE 20

10.0 g. of 1-[5-nitro-thiazolyl-(2)]-2-oxo-tetrahydro-imidazole are stirred and heated at 150° C. for 4 hours with 20.0 g. of benzoic anhydride. The reaction mixture is then recrystallized from dimethyl formamide to obtain 1-[5-nitro-thiazolyl-(2)]-2-oxo - 3 - benzoyl - tetrahydroimidazole of the formula

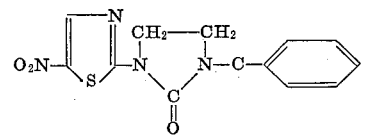

in the form of yellow crystals melting at 273° C.

EXAMPLE 21

10.0 g. of 1-[4-methyl-5-nitrothiazolyl-(2)]-2-oxo-tetrahydro-imidazole are heated at the boil for 4 hours with 50 ml. of acetic anhydride. After cooling, a precipitate forms which is recrystallized from dioxan. There is obtained in this manner 1-[4-methyl-5-nitro-thiazolyl-(2)]-2-oxo-3-acetyltetrahydro-imidazole of the formula

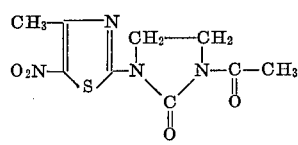

which melts at 213–215° C.

EXAMPLE 22

At 10° C., 20 ml. of concentrated nitric acid are stirred into a solution of 5.0 g. of 1-[thiazolyl-(2)]-3-acetyl-2-oxo-tetrahydro-imidazole in 50 ml. of concentrated sulfuric acid. The batch is stirred for 3 hours at 10° C., then poured on ice. The precipitate which forms is filtered off and recrystallized from methanol+dimethylformamide. There is obtained in this manner the 1-[5-nitro-thiazolyl-(2)] - 2 - oxo-3-acetyl-tetrahydro-imidazole of melting point 166° C. which is identical with the product described in Example 14.

The 1 - [thiazolyl-(2)]-3-acetyl-2-oxo-tetrahydro-imidzaole used as starting material can be prepared by acetylating 1-[thiazolyl-(2)]-2-oxo-tetrahydro-imidazole with acetic anhydride. The compound melts at 185° C.

EXAMPLE 23

10.0 g. of 1-[4-(para-nitrophenyl)-5-nitro-thiazolyl-(2)]-2-oxo-tetrahydro-imidazole and 50 ml. of acetic anhydride are stirred while being heated at 120° for 4 hours. After cooling, the precipitate that has formed is filtered off and recrystallized from aqueous dimethylformamide. There is obtained the 1-[4-(para-nitrophenyl)-5-nitro-thiazolyl-(2)]-oxo-3-acetyl-tetrahydro-imidazole of the formula

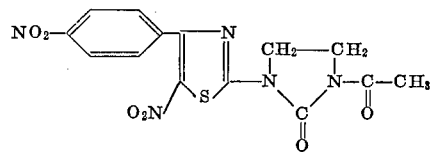

in the form of yellow crystals of melting point 245–247° C.

EXAMPLE 24

2.0 g. of 1-[5-nitro-thiazolyl-(2)]-2-oxo-hexahydro-pyrimidine in 5.0 ml. of dimethylformamide are heated at 130° C. for 2 hours with 5.0 ml. of acetic anhydride. After cooling, 50 ml. of water are added, and the batch extracted with 50 ml. of methylene chloride. The methylene chloride layer is separated and evaporated under vacuum. There remains a crystalline residue of 1-[5-nitrothiazolyl-(2)]-2-oxo-3-acetylhexahydropyrimidine of the formula

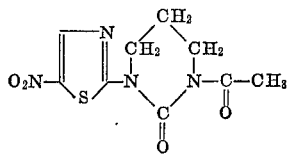

which after being recrystallized from a mixture of methylene chloride and petroleum ether melts at 220–230° C.

EXAMPLE 25

10.0 g. of 1 - [5-nitrothiazolyl - (2)] - oxo-tetrahydro-imidazole are heated at 150° C. for 4 hours wtih 50.0 g. of butyric anhydride. After cooling, ethanol is added and the batch filtered. The filtrate is evaporated, and the residue recrystallized from aqueous ethanol. The 1-[5-nitrothiazolyl - (2)]-2-oxo-3-butyryl-tetrahydro-imidazole of the formula

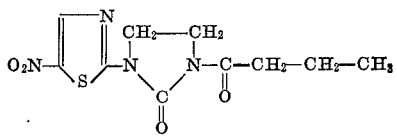

is obtained in the form of yellow crystals melting at 143–145° C.

EXAMPLE 26

3 ml. of concentrated nitric acid are added at room temperature to a solution of 10 g. of 1-[thiazolyl-(2)]-2-oxo-3 - (β-diethylamino-ethyl)-tetrahydro-imidazole in 75 ml. of concentrated sulfuric acid. The reaction mixture is stirred for 8 hours at room temperature, then poured on to ice and carefully neutralized by the addition of ammonia. A precipitate settles out which is recrystallized from alcohol to yield 1-[5-nitro-thiazolyl-(2)]-2-oxo-3-(β - diethylaminoethyl)-tetrahydro-imidazole of the formula

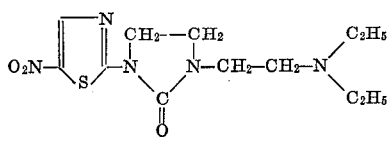

in the form of yellow crystals melting at 140–141° C.

The 1 - [thiazolyl-(2)]-2-oxo-3-(β-diethylaminoethyl)-tetrahydro-imidazole used as starting material is prepared as follows:

17 g. of 1 - [thiazolyl-(2)]-2-oxo-tetrahydro-imidazole are added to a suspension of 2.4 g. of sodium hydride in 200 ml. of toluene, and the whole is heated for 2 hours at 90° C. The reaction mixture is cooled to 50° C., and 15 g. of β-diethylamino-ethyl chloride are added dropwise. The batch is heated for 4 hours at 90° C., 50 ml. of alcohol are then added at room temperature, the reaction mixture evaporated in vacuo, and the residue ditsilled in a high vacuum 1 - [thiazolyl - (2)]-2-oxo-3-(β-diethylaminoethyl)-tetrahydroimidazole distills at 163–165° C. under 0.1 mm. pressure.

EXAMPLE 27

1.6 g. of concentrated nitric acid are added to a solution of 4.0 g. of 1 - [thiazolyl-(2)]-3-methyl-2-oxo-tetrahydro-imidazole in 20 ml. of concentrated sulfuric acid and the mixture stirred for 4 hours at room temperature. The reaction mixture is poured on ice. The precipitate which forms is filtered off and washed with acetone. There is obtained in this manner 1 - [5-nitrothiazolyl-(2)]-3-methyl-2-oxo-tetrahydro-imidazole-(2) of the formula

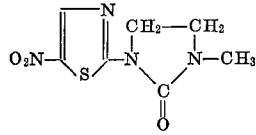

which melts at 239–241° C.

The 1 - [thiazolyl-(2)]-3-methyl-2-oxo-tetrahydroimidazole may be prepared as follows:

To a solution of 15.0 g. of 2-amino-thiazole in 150 ml. of boiling ether are slowly added dropwise 16.0 g. of β-chlorethylisocyanate. When the mixture is allowed to stand for a while, the $N^1$ - [thiazolyl-(2)]-$N^2$-(β-chlorethyl)-urea crystallizes. After being recrystallized from alcohol it melts at 142–143° C.

10 g. of the chlorethyl urea are boiled for 4 hours with 300 ml. of water. The precipitate which forms is filtered off and recrystallized from dimethylformamide+methanol. There is obtained 1-[thiazolyl-(2)]-2-oxo-tetrahydroimidazole in the form of white crystals of melting point 209–210° C.

10.0 g. of 1-[thiazolyl-(2)]-2-oxo-tetrahydro-imidazole are added to a suspension of 1.5 g. of sodium hydride in 100 ml. of toluene and the mixture stirred while being heated at 80° C. for 1 hour. There are then slowly added 8.0 g. of dimethyl sulfate, and, after 4 hours, the batch cooled to room temperature and filtered. The filtrate is evaporated under reduced pressure. The residue is recrystallized from methanol and 1-[thiazolyl-(2)]-3-methyl-2-oxo-tetrahydroimidazole obtained in the form of crystals melting at 128–130° C.

EXAMPLE 28

Chick starter containing 0.005% of compound I and 0.0075% of compound II as coccidiostatic ingredients:

|  | G. |
|---|---|
| I: 1-[5 - nitrothiazolyl(2)] - 2 - oxo-tetrahydroimidazole | 50.0 |
| II: 2-sulfaniliamido-6-chloropyrazine | 75.0 |

| Formula: | Pounds |
|---|---|
| Corn meal | 1103.0 |
| Soybean meal, 44% protein | 660.0 |
| Alfalfa meal | 30.0 |
| Dicalcium phosphate | 40.0 |
| Limestone meal | 10.0 |
| Salt | 5.0 |
| Fish meal, 60% protein | 40.0 |
| Stabilized fat | 60.0 |
| Dried whey | 40.0 |
| Manganese sulfate | 0.5 |
| Zinc oxide | 0.3 |
| d,l-Methionine | 1.5 |
| Vitamin premix | 10.0 |
|  | 2000.3 |

10 lb. of the vitamin composition contain: 16,000,000 I.U. vit. A, 1,000,000 I.U. vit. $D_3$, 5,000 I.U. vit. E acetate, 6 g. vit. $K_3$, 6 mg. vit. $B_{12}$, 3 g. riboflavin, 30 g. niacin, 5 g. calcium pantothenate and 100 g. ethoxyquin, made up to 10 lb. wtih corn meal.

The compounds I and II are first premixed with a small amount (about 2 lb.) of the feed mixture (which is supplied as such by the manufacturer). The premix is increased to about 50 lb. and then thoroughly mixed with the main batch in a horizontal mixer.

EXAMPLE 29

A premix containing one percent of 1-[5-nitro-thiazolyl- (2)]-2-oxo-tetrahydroimidazole is prepared as follows (for 1000 g.):

Ingredients: G.
1-[5-nitro-thiazolyl-(2)] - 2 - oxo-tetrahydro-
 imidazole _____ 10.00
Sugar, confectioners _____ 100.00
Soybean, feed, solvent extracted ___ 890.00

The ingredients are thoroughly mixed in appropriate mixing equipment. The premix is then added to the feed formula in desired quantities.

Feed formula: G.
Corn meal _____ 502,000.0
Soybean meal, 44% protein _____ 226,800.0
Alfalfa meal _____ 18,144.0
Meat and bone meal _____ 45,360.0
Whey, dried _____ 9,072.0
Distillers dried solubles _____ 22,680.0
Fish meal _____ 58,800.0
Fish oil _____ 18,144.0
Vitamin premix _____ 2,268.0
Mineral premix _____ 907.2
Sodium chloride _____ 2,268.0
Menadione sodium bisulphite _____ 4.0
Niacin _____ 30.0

The feed formula is prepared as previously shown; the vitamin premix has the following ingredients:

Vitamin A—4,000,000 U.S.P. units
d-Pantothenic acid—3,680.0 g.
Riboflavin—4.0 g.
Vitamin $B_{12}$—0.003 g.
 Vitamin $D_3$—2,000,000 U.S.P. units
 Vitamin E—2,500 I units whereas the Mineral premix contains the following essential minerals:

| | Percent |
|---|---|
| Manganese | 6.00 |
| Iodine | 0.12 |
| Iron | 2.00 |
| Copper | 0.20 |
| Zinc | 2.00 |
| Cobalt | 0.02 |
| Calcium | 25.20 |

The premix is added to the above feed formula in an amount sufficient to provide concentrations of 0.5 g. and 1.0 g. of 1-[5-nitro-thiazolyl-(2)]-2-oxo-tetrahydroimidazole per 1,000 g. of feed.

What is claimed is:
1. A compound of the formula

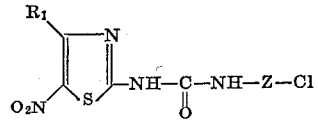

in which $R_1$ stands for a member selected from the group consisting of hydrogen, lower alkyl, phenyl, lower alkylphenyl, lower alkoxyphenyl, halogenophenyl, trifluoromethyl-phenyl and nitrophenyl, and Z represents a member selected from the group consisting of unsubstituted straight chain lower alkylene containing 3 to 5 carbon atoms and straight chain lower alkylene containing 2 to 5 carbon atoms substituted by from one to two lower alkyl groups.

2. A compound as claimed in claim 1, said compound having the formula

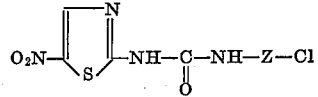

in which Z stands for a member selected from the group consisting of ethylene(1,2) which is substituted by at least one methyl radical, and propylene(1,3).

3. A compound of claim 1, said compound being N-(2-chloropropyl)-N'-[5-nitrothiazolyl-(2)]-urea.

4. A compound of claim 1, said compound being N-[2-chlorobutyl-(3)]-N'-[5-nitrothiazolyl-2)]-urea.

5. A compound of claim 1, said compound being N-(3-chloropropyl)-N'-[5-nitrothiazolyl-(2)]-urea.

6. A compound of claim 1, said compound being N-(β-chloro-tertiary butyl)-N'-[5-nitrothiazolyl-(2)]-urea.

References Cited

UNITED STATES PATENTS 2,755,285  7/1956  O'Neill et al. _____ 260—306.8
3,178,444  4/1965  Schmidt et al. _____ 260—306.8

OTHER REFERENCES

Burger: Medicinal Chemistry, N.Y., 1960, p. 43.

ALEX MAZEL, Primary Examiner

R. J. GALLAGHER, Assistant Examiner

U.S. Cl. X.R.

260—239.3, 247.1, 256.5, 268, 293.4, 294.8, 213.4, 326.3; 424—229, 232, 245, 251, 270

UNITED STATES PATENT OFFICE
CERTIFICATE OF CORRECTION

Patent No. 3,503,989    Dated March 31, 1970

Inventor(s) PAUL SCHMIDT ET AL

It is certified that error appears in the above-identified patent and that said Letters Patent are hereby corrected as shown below:

Column 1, line 35, change "possily" to read --- possibly ---; line 54, after "abandoned" insert --- ) ---.

Column 2, line 68, change "methally" to read --- methallyl ---.

Column 3, lines 70-71, the formula should read:

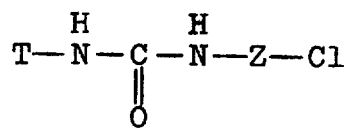

line 69, change "compounds" to read --- compound ---; line 74, after "meanings" delete "," and insert --- — ---.

Column 5, lines 3-4, change "adantageous" to read --- advantageous ---; line 69, change "from" to read --- form ---.

Column 7, line 9, before "N'" insert --- — ---; line 55, change "thiazonyl" to read --- thiazolyl ---.

Column 9, line 15, change "dimethylaminoeth-" to read --- diethylaminoeth- ---.

CASE 5082/1+2/5350/1+2/
5454/1-3/5517/CIP/
1+2/CONT./3

PO-1050
(5/69)

UNITED STATES PATENT OFFICE
CERTIFICATE OF CORRECTION

Patent No. 3,503,989        Dated March 31, 1970

Inventor(s) PAUL SCHMIDT ET AL

It is certified that error appears in the above-identified patent and that said Letters Patent are hereby corrected as shown below:

Column 11, lines 44 to 49, the middle of the formula should read:

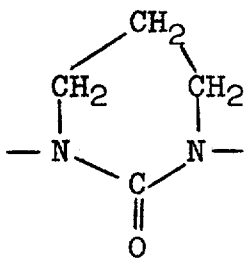

Column 12, lines 5-9, the right hand side of the formula should read:

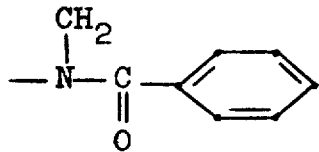

line 54, after "-(2)]" insert --- -2 ---.

Column 13, line 13, change "230°C" to read --- 223°C ---;
line 64, change "ditsilled" to read --- distilled ---.

Column 16, line 31, after "nitrothiazolyl-" insert
--- ( ---.

Signed and sealed this 30th day of March 1971.

(SEAL)
Attest:

EDWARD M. FLETCHER, JR.
Attesting Officer

WILLIAM E. SCHUYLER, JR.
Commissioner of Patents